United States Patent [19]

Pierson et al.

[11] Patent Number: 5,204,610
[45] Date of Patent: Apr. 20, 1993

[54] LONG LIVED DUAL BATTERY WITH AUTOMATIC LATCHING SWITCH

[75] Inventors: John R. Pierson, Brookfield; Thomas J. Dougherty, Waukesha; Ronald C. Klassen, Elm Grove, all of Wis.

[73] Assignee: Globe-Union, Inc., Milwaukee, Wis.

[21] Appl. No.: 656,772

[22] Filed: Feb. 15, 1991

[51] Int. Cl.⁵ .............................. H02J 7/04; H02J 7/14
[52] U.S. Cl. ........................................ 320/15; 320/8; 307/66
[58] Field of Search ........................ 320/6, 8, 3, 15, 7; 307/66

[56] References Cited

U.S. PATENT DOCUMENTS

| | | | |
|---|---|---|---|
| 3,165,639 | 8/1960 | Hughes | 320/18 |
| 3,475,221 | 10/1969 | Jordan et al. | |
| 3,607,403 | 9/1971 | Arrance | |
| 3,823,358 | 7/1974 | Rey | 320/15 X |
| 4,239,839 | 12/1980 | McDowall et al. | 429/154 |
| 4,447,504 | 5/1984 | Goebel | 429/9 |
| 4,709,202 | 11/1987 | Koenck et al. | 320/39 X |
| 4,770,954 | 9/1988 | Noordenbos | 429/9 |
| 4,883,728 | 11/1989 | Witehira | 429/160 |
| 5,002,840 | 3/1991 | Klebenow et al. | 429/9 |

FOREIGN PATENT DOCUMENTS 0398691 11/1990 European Pat. Off. .

OTHER PUBLICATIONS

An Intelligent Two-In-One SLI Battery, Batteries International, Oct. 1990, pp. 12-13.
Buick Dealer Service Bulletin re: Special Policy (Power Reserve Battery System Conversion), Oct. 1985.
Publication re: Exide Switch. (Date unavailable).

*Primary Examiner*—R. J. Hickey
*Attorney, Agent, or Firm*—Foley & Lardner

[57] ABSTRACT

A latching automatic dual battery switch employs a first comparator to determine that a condition requiring engagement of a secondary battery exists. For example, a primary battery voltage is below a predetermined threshold, current drawn from the primary battery exceeds a predetermined threshold or ambient temperature is below a predetermined threshold. Engagement of an ignition switch is detected and used to clock the output of the comparator to a trigger circuit. The trigger circuit activates the triggerable switch on the leading edge of a signal generated by the detector circuit to connect a secondary battery or power source in parallel with the primary power source. The trigger circuit is leading edge activated so that conditions immediately prior to engagement of the ignition switch determine if the secondary battery is engaged. This avoids engaging the secondary battery as a result of a load surge dragging down the voltage after activation of an ignition switch. In addition, when the ignition switch is released, a timing circuit is engaged to limit the additional time during which the secondary battery is switched in the circuit. The automatic engagement of the secondary battery eliminates the need for manually switching to an emergency backup and manually disengaging the emergency backup after a vehicle is started.

25 Claims, 6 Drawing Sheets

LONG LIVED DUAL BATTERY WITH AUTOMATIC LATCHING SWITCH

BACKGROUND OF THE INVENTION

Technical Field

The present invention relates, generally, to systems for providing backup power supplies, and more particularly, to long lived rechargeable vehicle battery systems including a main and a reserve battery.

Background, Art, and Technical Problems

Vehicle battery systems having a main and reserve unit, separated by a one-way diode for maintaining the reserve unit in the charged condition during non-use, are generally known. A switchable dual battery, for example, one disclosed by Pacific-Dunlop of Australia, has a series of thin, flat, parallel electrode plates. A first portion of the plates forms a main battery and a second, adjacent portion parallel to the first portion forms a reserve battery. The two batteries are electrically configured in parallel, with a one-way diode disposed therebetween to prevent the reserve unit from discharging during periods of non-use. A manually operable switch, interposed between the two batteries, in parallel with the diode, bypasses the diode when it is desirable to discharge the reserve unit. A Power Reserve Battery system, bearing the name DELCO POSIPOWER, which has been observed in certain 1985 model automobiles, employs a bypass system located in a remote control box. The bypass can be manually activated to establish communication between a reserve battery and a starting circuit in the event the main battery lacks sufficient power to energize the latching solenoid. Related U.S. application Ser. No. 07/365,084, now U.S. pat. No. 5,002,840, discloses a switched emergency battery system which provides a main battery in selective electrical communication with a reserve battery according to the state of a manually activated switching mechanism. The switching mechanism is disposed within the cover of the battery and includes a manually operable actuator for selectively establishing communication between the main and reserve batteries. A one-way diode, in parallel with the switch, prevents the reserve battery from discharging when the switch is open, but allows current to pass through the diode to maintain the reserve battery in the charged state. When the main battery output is insufficient to start a vehicle, the operator manipulates the switch to the closed position. This brings the reserve battery, which is maintained in the fully charged state by the diode/variable resistor circuit, into parallel communication with the main battery. Upon starting the vehicle, the operator manipulates the switch back to the open position, thereby preventing further drain from the reserve battery. The main battery is recharged in the conventional manner and the reserve battery is recharged at a lower rate through the diode/variable resistor circuit.

Each of the above-described systems employs a manually activated switch. In each case, the operator must first determine that the main battery is insufficient to activate the system, manually engage a switch to connect a reserve battery, and then manually disengage the switch after the vehicle is started to prevent further drain of the reserve battery. Operator confusion resulting when the vehicle fails to start for an unrelated reason could cause the operator to unnecessarily engage the manual switch. In addition to the inconvenience of manually activating a switch to engage the reserve capacity, system reliability may be impaired if the operator neglects to return the switch to its original position after the vehicle is started.

SUMMARY OF THE INVENTION

A preferred embodiment of the switched long lived battery system of the present invention provides a main battery, such as a deep cycle battery, in selective electrical communication with the reserve battery, such as a high power battery, through an automatically activated switch. The switch is triggered to provide a secondary battery in parallel with the primary battery. When a comparator determines that the primary battery voltage falls below a predetermined level, subsequent engagement of a vehicle ignition switch automatically activates a triggerable switch that connects the secondary battery in parallel with the primary battery. A timing circuit causes the switch connecting the secondary battery in parallel with the primary battery to be opened at a fixed time after release of the ignition switch.

In accordance with one aspect of the invention, the triggerable switch is activated to connect the secondary battery in parallel with the primary battery by the leading edge of a clock signal to a flip flop. The clock signal is generated by a comparator circuit which is biased to a slightly negative voltage using the secondary battery as a power source. Engagement of the vehicle ignition switch causes a non-negative voltage to appear on the comparator causing the output of the comparator to generate a positive going leading edge used to clock the flip flop. Since the non-negative voltage remains while the ignition switch is engaged, a trailing edge appears on the comparator output when the ignition switch is released. The trailing edge is used as an input to a timing circuit which resets the flip flop at a fixed delay after occurrence of the trailing edge. When clocked, the output of the flip flop is governed by the status of another comparator circuit which compares the primary voltage to a predetermined reference. As a result, activation of the triggerable switch placing the secondary battery in parallel with the primary battery requires the predetermined reference to exceed the primary voltage prior to engagement of the vehicle ignition switch. This timing arrangement avoids the possibility that the secondary battery will be brought into the circuit as a result of voltage drop created by a surge load occurring upon engagement of the vehicle ignition switch.

BRIEF DESCRIPTION OF THE DRAWING

Preferred exemplary embodiments of the present invention will hereinafter be described in conjunction with the appended drawings, wherein like numerals denote like elements, and.

DETAILED DESCRIPTION OF THE PREFERRED EMBODIMENTS

Figure 1:
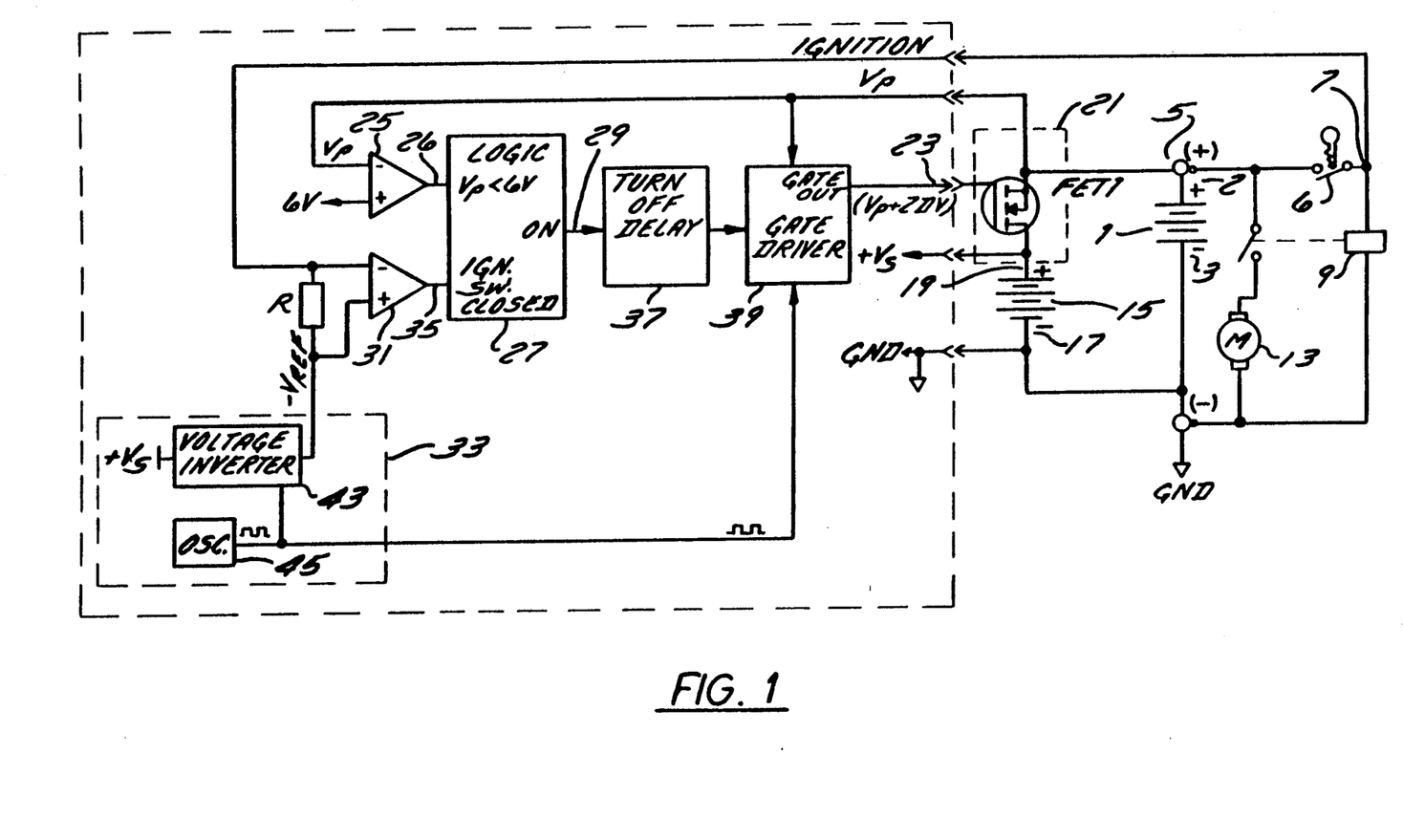
FIG. 1 is an overall block diagram of a latching automatic dual battery switch according to the invention.

FIG. 1 shows primary battery 1 having a positive terminal 2 connected to power supply terminal 5 and negative terminal 3 connected to ground. In normal operation, engagement of ignition switch 6 to the closed position causes the voltage on the primary battery to appear at the ignition sense or system power terminal 7. In response, inductor portion 9 of the starter solenoid causes closing of the switch portion 11 in order to apply power from the primary battery 1 to starter motor 13. The secondary battery 15 has a negative terminal 17 also connected to ground and a positive terminal 19 connected to one of the terminals of triggerable switch 21. Another terminal of triggerable switch 21 is connected to power supply terminal 5. A trigger input 23 activates triggerable switch 21 to engage the secondary battery 15 in parallel with primary battery 1 under specific low primary battery voltage conditions.

Low primary battery voltage conditions can be detected in a number of ways. For example, the primary battery voltage can be monitored and compared with a threshold, so that when the monitored primary battery voltage drops below the threshold, the secondary battery can be engaged. Alternatively, starting current can be monitored, so that when the starting current drawn from the primary battery exceeds a predetermined threshold, the secondary battery is engaged. Another alternative is to monitor the ambient temperature around the battery, so that when the temperature drops below a predetermined threshold, the secondary battery is engaged. Each of these alternatives can be employed separately or a combination of any two or more can be employed together, as desired.

In the preferred embodiment discussed below, low primary voltage conditions are detected by low voltage comparator 25. The output 26 of primary voltage condition comparator 25 is raised to a logical high state when the primary voltage drops below a predetermined reference, for example, six volts. Logic circuitry 27 generates a low voltage detect output on signal line 29 if the ignition switch is closed after the output 26 of voltage comparator 25 is a logical 1. Ignition sense comparator 31 detects the closing of ignition switch 6. This is accomplished through bias circuit 33 which acts to put a negative reference voltage on both terminals of comparator 31. It should be noted that bias circuit 33 is powered from the secondary battery, so that the negative bias on comparator 31 is generated independently of the condition of primary battery 1. Closure of ignition switch 6 causes one of the terminals of comparator 31 to exceed the negative voltage reference on the other terminal, thereby generating a positive going edge on signal line 35 to trigger logic element 27. The positive edge on signal line 25 causes logic element 27 to respond to the state of voltage comparator 25 and generate a low voltage detect signal 29 when the primary battery voltage has previously dropped below the voltage reference on comparator 25.

The output on signal line 29 is passed through turn off delay circuit 37 to gate driver 39. Gate driver 39 generates signal 23 which causes closure of triggerable switch 21 when the primary voltage is below the predetermined reference. Turn off delay circuit 37 causes the gate driver 39 to continue to activate the triggerable switch for a fixed period of time after the ignition switch 6 is released. The turn off delay, for example twenty seconds, is selected to allow maximum recharge of the secondary battery after the engine is started. The purpose of turning off the triggerable switch at the end of the delay period is to eliminate the possibility of the secondary battery discharging into an erroneously connected load, e.g., headlights left on, without relying the operator to disconnect the secondary battery. Gate driver 39 must provide sufficient voltage to drive the triggerable switch. The output level required on signal line 23 to drive the triggerable switch may be a function of the electronic device selected as triggerable switch 21. Bias circuit 33 can be used to provide a compatible signal. In the block diagram of FIG. 1, bias circuit 33 has a voltage invertor 43 and an oscillator 45. The output of oscillator 45 can be routed to the gate driver 39 and used, for example, to drive a voltage multiplier (doubler, tripler, etc.), or similar circuit to generate the necessary voltage levels on signal line 23.

Figure 2:
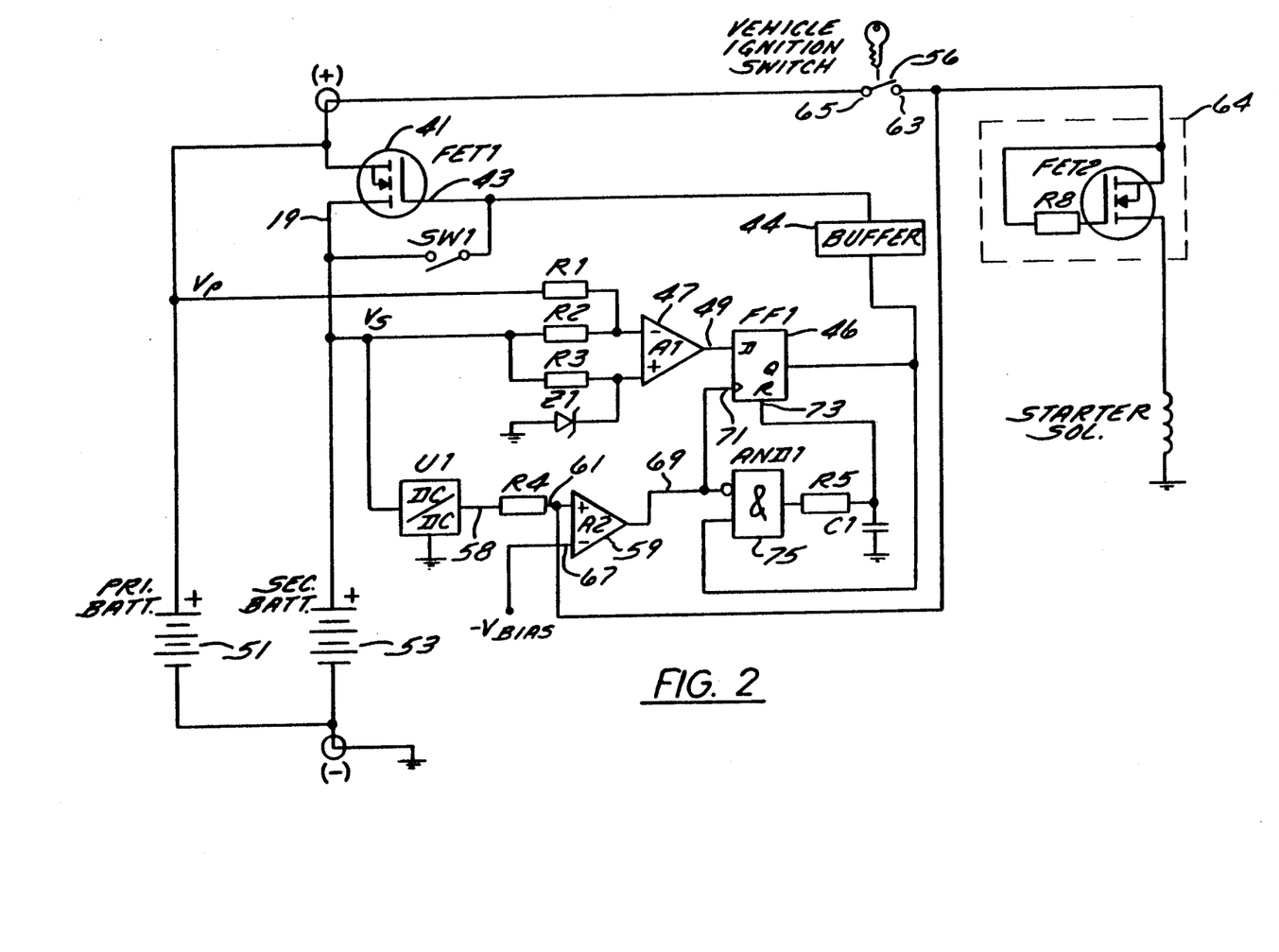
FIG. 2 is a simplified block diagram of the latching automatic dual battery switch, according to the invention.

FIG. 2 is a simplified block diagram showing the use of field effect transistor 41 to perform the function of triggerable switch 21. The gate terminal 43 of the field effect transistor is driven via a signal line connected from an output of flip flop 46. As was discussed above relative to the gate driver 39 and, as is shown in more detail in FIGS. 3A and 3B, it is preferable to employ buffer 44, such as a voltage multiplier or charge pump circuit between the output of flip-flop 46 and the gate of FET 41 The output of flip flop 46 is controlled by the state of comparator 47 whose output 49 drives an input of flip flop 46. The state of comparator output 49 is determined by the condition of primary battery 51, whose voltage appears on a first terminal of comparator 47, relative to a predetermined reference voltage established on a second terminal of comparator 47 using, for example, zener diode Z1. It should be noted that the predetermined reference is established using secondary battery 53 as a source. This allows the reference voltage to be established independent of the condition of the primary battery.

As previously noted, the secondary battery is used in a bias circuit 33 to establish a slightly negative reference voltage to detect activation of the vehicle ignition switch. As shown in FIG. 2, the voltage invertor 43 and oscillator 45 of FIG. 1 can be configured to form a DC to DC converter 55 which establishes a negative voltage on signal line 58. Comparator 59 has input terminal 61. When ignition switch 56 is not activated (open), input terminal 61 has approximately the same negative voltage as signal line 58, since virtually no current flows through resistor R4. When vehicle ignition switch 56 is closed, a non-negative voltage appears on input terminal 61. This is because the system power terminal 63 becomes connected to the power supply terminal 65, which is routed to primary battery 51. In the event the primary battery 51 is completely discharged, a voltage of at least zero volts appears on comparator input terminal 61. Since input terminal 67 of comparator 59 is at $-V_{bias}$, a potential at least slightly less than zero volts, closure of ignition switch 56 causes output 69 of comparator 59 to change state, indicating that the ignition switch has been engaged. Thus, under all primary battery conditions key closure to engage the ignition switch is detected. It should be noted that in future vehicles it would be possible to employ in place of switch 56 a key entity which, upon engagement, always provides a grounded output that can be routed to input 61 of comparator 59. This would also ensure detection by comparator 59 each time the ignition key is closed. It should also be noted that key closure can be detected using any voltage other than the battery voltage. For example, a low positive voltage could be employed.

Output signal 69 of comparator 59 is routed to a clock input 71 of flip flop 46. The clock edge causes the output of flip flop 46 to assume a state indicating the condition of output 49 from primary battery condition comparator 47. For example, in the event that voltage on primary battery 51 has fallen below the predetermined reference voltage set by zener diode Z1, output 49 of comparator 47 will be at a logical 1 state. When the vehicle ignition switch 56 is engaged, output 69 of comparator 59 generates a positive going edge to clock input 71 of flip flop 46. The Q output of flip flop 46, shown herein as a D-flip flop, will then transition to the logical high on the D input. The Q output is routed to gate terminal 43 of field effect transistor. This logical high on the gate terminal 43 causes the source and drain of transistor 41 to be interconnected. Transistor 41 is arranged to have one of the drain and source terminals connected to power supply terminal 65 and the remaining terminal connected to the secondary battery 53. When gate input 43 assumes a logical high state causing transistor 41 to connect its drain and source terminals through a very low resistance, secondary battery 53 is placed in parallel with primary battery 51. This provides sufficient power to start the engine, so that the primary battery can be recharged. Optional circuitry 64 employs FET 2 between the starter solenoid and the ignition switch. FET 2 serves to limit the load on the negative voltage source, which limits the drain on the secondary battery 53 when the ignition switch is open. In addition, FET 2 can be independently controlled by an engine computer, although it would be necessary to switch FET 2 to the on condition each time the engine is started. FET 2 could be replaced by a diode with the cathode connected to the solenoid and the anode connected to the ignition switch to eliminate this requirement.

It should be noted that the signal transitions and logical states described above are by way of illustration and are not intended as further limitations on the invention. It will be known to those of ordinary skill that the switching devices, comparators and flip flops discussed above can be arranged to employ negative going signals and negative edge trigger logic devices, or combinations of positive and negative edge triggered devices as may be convenient. In addition, other types of flip-flops including, but not limited to, R-S & J-K flip flops may be employed as would be known by those of ordinary skill.

In order to prevent secondary battery 53 from being discharged for an inordinately long period of time and to allow for its recharge, output 69 of comparator 59 is also routed to a time delay circuit formed by gate 75, resistor R5 and capacitor Cl. The time delay circuit causes the trigger pulse at gate terminal 43 of field effect transistor 41 to be reversed after a predetermined time frame. As shown in FIG. 2, this can be accomplished using reset terminal 73 of flip flop 46. Through an inversion, AND gate 75 detects the presence of the trailing edge of signal 69, which indicates the release of vehicle ignition switch 56 following its activation. The presence of a trigger signal at gate terminal 43 of field effect transistor 41 is indicated by the Q output of flip flop 46, which is routed to another input of gate 75. At the time both conditions exist, AND gate 75 generates a positive going leading edge. Resistor R5 and capacitor C1 are configured so that capacitor C1 is charged over a time constant. This causes flip flop 46 to be reset when the voltage across the capacitor exceeds the reset level at a fixed time after the AND gate 75 has generated its positive edge. The resetting of flip flop 46 removes the trigger signal from gate terminal 43 and from one of inputs to AND gate 75. As a result the reset condition is removed from flip flop 46 so that flip flop 46 is available to respond again to the conditions described above.

It should be noted that, since flip flop 46 is an edge triggered device, the condition existing on output 49 of comparator 47 prior to engagement of the vehicle ignition switch is the condition reflected in the output of flip flop 46. After the clock input 71 of flip flop 46 is triggered by the output 69 of comparator 59, further changes in the signal level on output 49 of comparator 47 have no effect on the output of flip flop 46 until another clock signal, indicating another engagement of ignition switch 56, is received. Thus, if the primary battery voltage exceeds the predetermined reference and the field effect transistor 41 is not triggered to engage secondary battery 53, a drop in the voltage at power supply terminal 65, which may occur as a result of the surge load introduced by engaging the ignition switch, does not cause the undesirable effect of engaging the secondary battery. If, however, after the first engagement of the vehicle ignition switch, the primary battery voltage does not recover from falling below the predetermined threshold, a subsequent engagement of the ignition switch will cause gate terminal 43 of field effect transistor 41 to be triggered, so that the secondary battery 53 is brought into the circuit.

Figure 4:
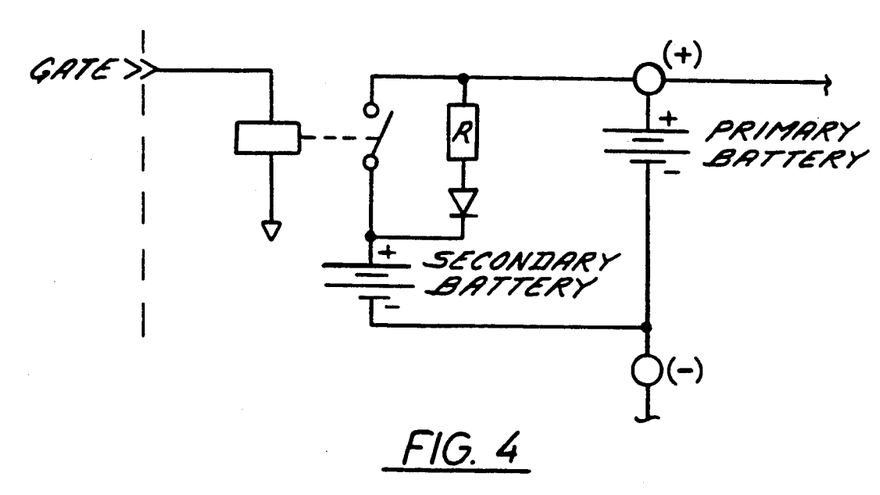
FIG. 4 illustrates the use of a solenoid in place of a field effect transistor as a triggerable switch.

It should be clear to one of ordinary skill that field effect transistor 41 can be replaced with any known switching device. FIG. 4 illustrates the replacement of field effect transistor 41 with a solenoid. Field effect transistor 41 and the solenoid are shown as illustrations of the invention and are not intended as limitations. Similarly, the RC time constant circuit used in generating the turn off delay is illustrative, as it would be known to those of ordinary skill that any timing circuit whether of an analog or a digital nature, could be employed.

Figure 3A:
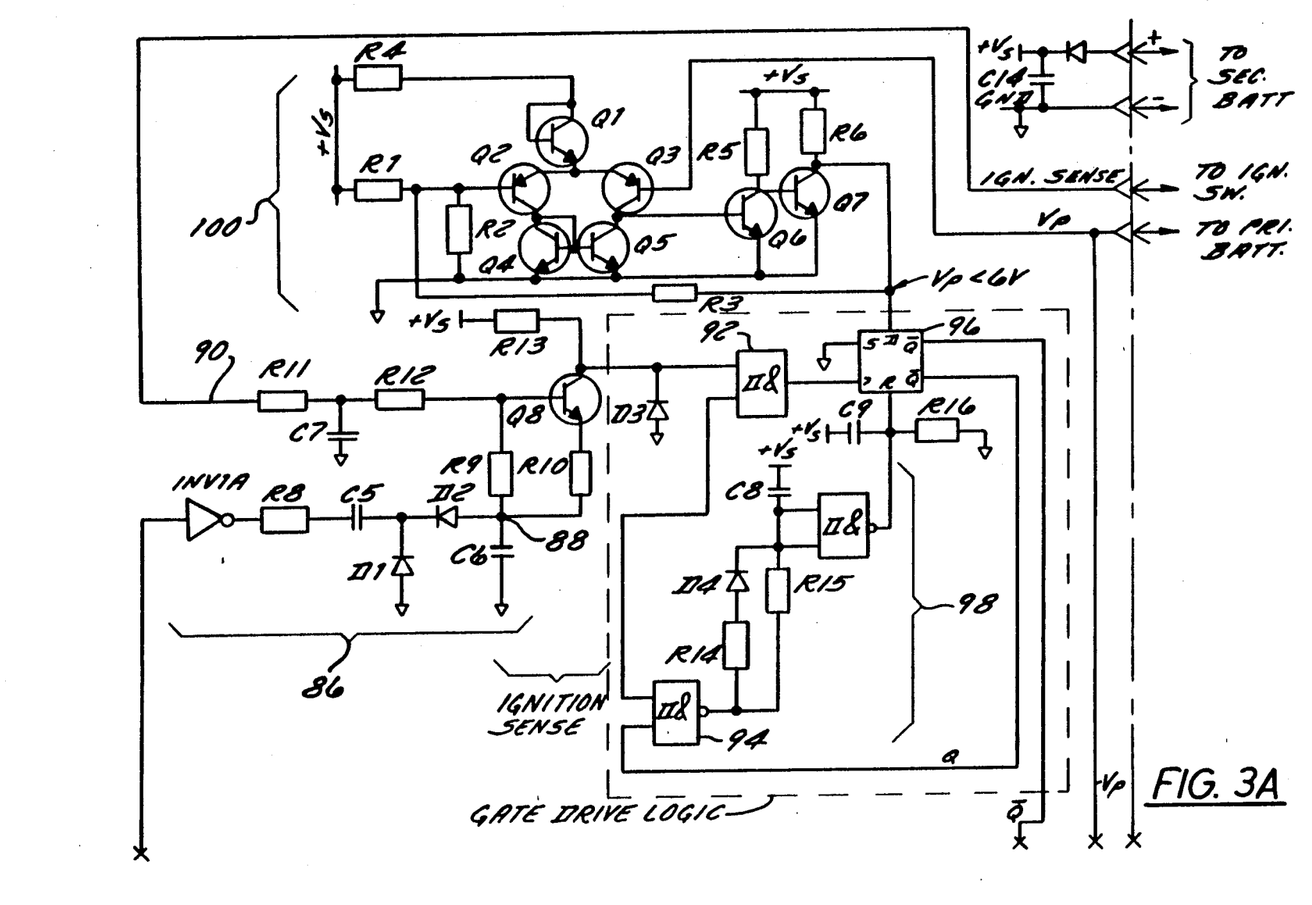
FIGS. 3A and 3B illustrate a circuit diagram of the latching automatic dual battery switch according to the invention.
Figure 3B:
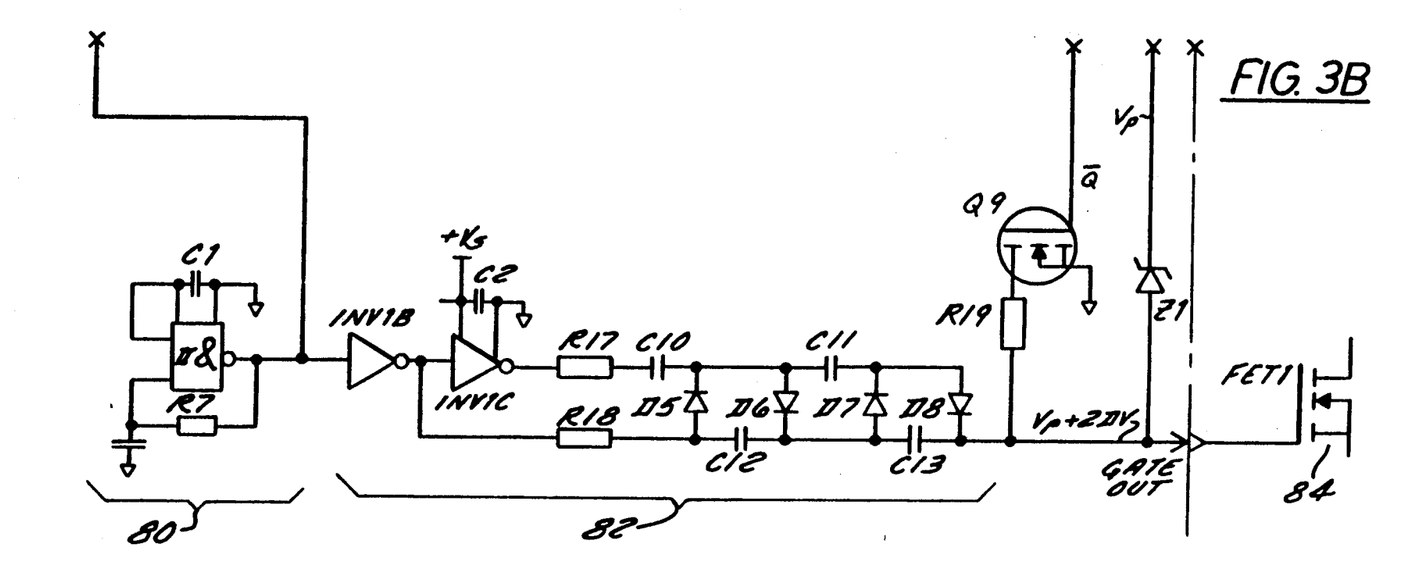

FIGS. 3A and 3B provide a more detailed embodiment of the invention. In this embodiment, oscillator circuit 80 generates a 200 kHz signal which is used to drive the voltage quadrupler or charge pump 82. Field effect transistor 84, which goes to the secondary battery (not shown in FIG. 3), is activated by a gate signal of approximately the primary voltage plus 20 volts. Voltage invertor 86 is used to establish a slightly negative reference voltage at the anode of diode D2 so that the ignition sense signal generated by engagement of the detected. This is accomplished by ignition sense circuitry 90 which incorporates resistors R9-R13, capacitor, C7 and transistor Q8, which are configured as a comparator. Detection is accomplished when a rising voltage biases transistor Q8 into the on condition pulling the voltage on the collector of Q8 down from about the level of the secondary battery toward about a diode drop above zero volts. This creates a signal state transition at both inputs to Schmitt trigger NAND gate 92 and one of the inputs to Schmitt trigger NAND gate 94. As a result, the output of NAND gate 92 develops a positive going leading edge and flip flop 96 is clocked so that its Q output and its inverted output are in accordance with the state of its D input. Voltage comparator 100 provides the signal to the D input of flip flop 96.

The D input of flip flop 96 is at a logical 1 when the primary battery voltage is below the predetermined voltage, for example, six volts. In this case, the inverted output of flip flop 96 after being clocked causes transistor Q9 to be turned off, so that a drive voltage appears at the gate of transistor 84 which is used to switch the secondary battery in parallel with the primary battery. The transition of the Q output of flip flop 96 causes Schmitt trigger NAND gate 94 to trigger the 20 second turn off delay circuit 98, so that flip flop 96 is returned to its previous state at the end of 20 seconds.

Figure 5:
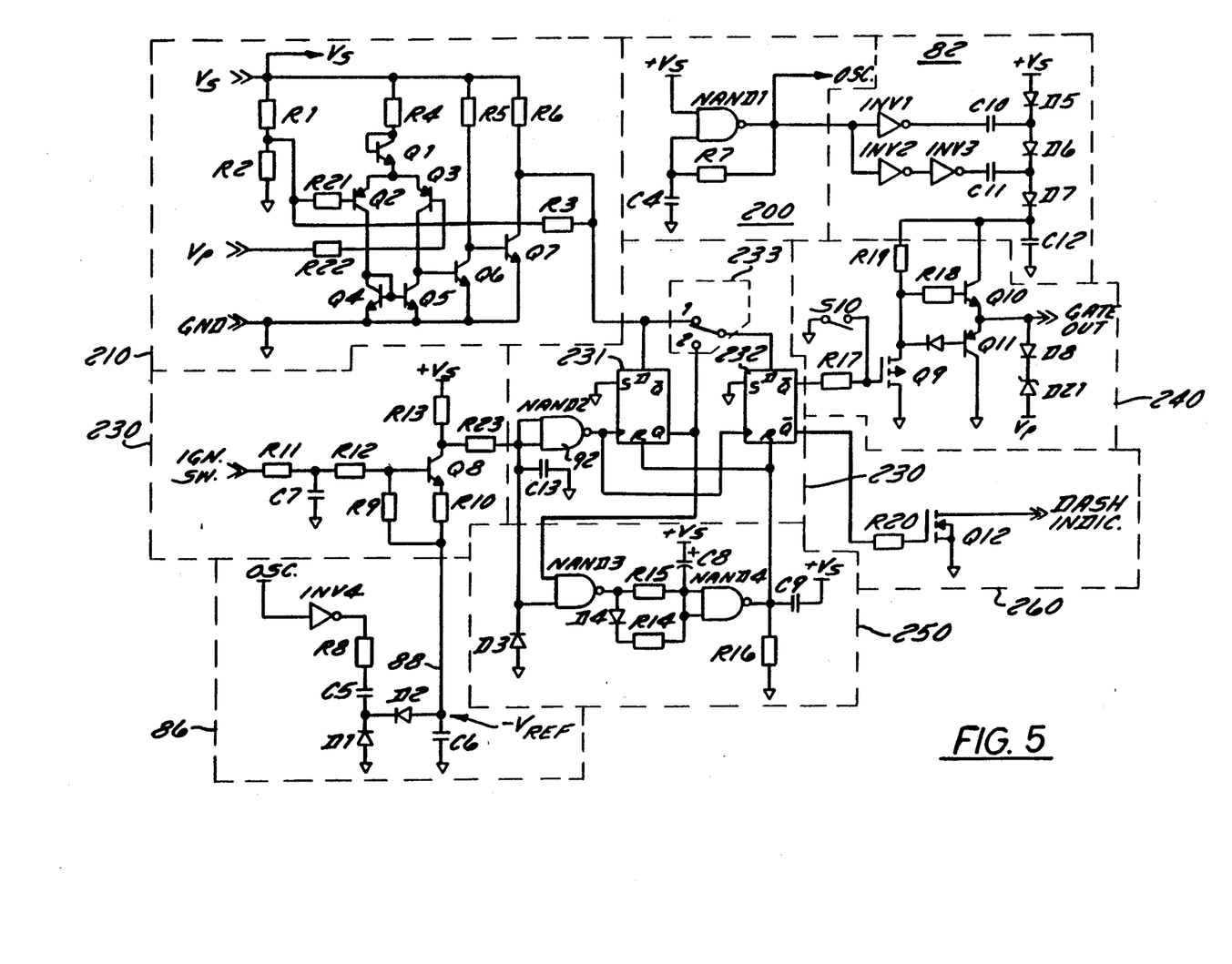
FIG. 5 illustrates another embodiment of the invention incorporating several additional features.

FIG. 5, which is similar to FIGS. 3A and 3B, illustrates another embodiment incorporating several additional features. Voltage comparator 210 differs from comparator 100 by the addition of R21 & R22 in series with the base of Q2 and Q3, respectively. Oscillator 200 corresponds to oscillator 80 shown in FIG. 3 and drives −V generator or voltage invertor 86 to produce −Vref on signal line 88. Ignition detector 230 differs from ignition sense circuit 90 by the addition of resistor R23.

Logic circuitry 230 employs a pair of cascaded flip-flops 231, 232. When set switch 233 is set in position 2, this arrangement causes triggering of the FET which switches the secondary battery into the ignition circuit only after a second ignition switch closure occurring before expiration of reset timer 230. The intent is to make the driver realize that the back-up system had been engaged because the first ignition switch closure would not start the vehicle, but releasing the key and then attempting a start a second time would engage the back-up. In operation, flip flop 231 responds to the output of input voltage comparator 210, which is connected to the D input of flip-flop 231. The operation of flip-flop 231 is the same as that of flip-flop 96 in FIG. 3A, which was previously discussed. Since the output of comparator 210 is a logical one where the primary battery has fallen below the predetermined threshold, the Q output of flip-flop 231 indicates this condition upon an engagement of the ignition switch. Flip-flop 232, which is clocked simultaneously with flip-flop 231, reads the output state of flip flop 231. Since they are edge triggered devices, flip-flop 231 has not yet detected the low voltage condition on the first closing of the ignition switch and flip-flop 232 does not trigger the output drive control circuitry 240 to engage the secondary battery FET. Instead, on a second engagement of the ignition switch after the primary battery voltage falls below the threshold, the output of flip-flop 232, reflects the state of the output of flip-flop 231 causing output drive control circuits 240 to activate the secondary battery FET switch. It should be noted that while the D input of flip flop 232 can be driven from one of the outputs of flip flop 231, an arrangement using counter 233 may also be employed.

If optional set switch 233 is in position 1, both flip flops 231 and 232 are triggered. Flip flop 232 triggers the output drive control circuits 240 to generate a gate output to the secondary battery FET in the same way as flip flop 96 in FIG. 3A. Optional set switch 233 can be a manual switch which is either factory set or accessible to the driver of the vehicle. In addition, switch 233 can be a programmed switch implemented by electronic or other means.

Reset timer 250 operates in the same manner as the turn-off delay circuits 98 shown in FIG. 3A. The pair of flip flops 231, 232 can be reset together as shown in FIG. 5. If the primary battery is low and the ignition switch is closed within the reset time out period, e.g., 20 seconds, the second engagement of the ignition switch triggers flip flop 232 based on the output of flip flop 231, as previously described, to activate the secondary battery FET. If the time out period expires before the second ignition switch closure, the initial conditions are restored and two additional ignition switch closures are required to engage the secondary battery. An additional timer could be employed to limit the time between two sequential ignition closures. Two reset timers could be employed, the second timer being triggered by the output of the flip flop 232. In this case, the second reset timer resets flip flop 232 to control how long the output drive control circuits command the FET to engage the secondary battery.

Output drive circuitry 240 is similar to the gate out circuitry in FIGS. 3A and 3B with the addition of diode D8. In addition, a manual override capability is included. When manual switch S10 is engaged, the gate of Q9 is grounded and the gate out signal continuously causes the FET to switch in the secondary battery. The manual switch can be located at the battery, at a location remote from the battery, e.g., the dashboard, or several such switches can be connected in parallel at convenient locations.

Dash light driver 260 employs transistor Q12 to complete a current path to ground when flip flop 232 causes the gate-out signal from output drive control circuitry 240 to switch the secondary battery in the circuit.

The incorporation of the above described automatic switching of a secondary or backup battery allows batteries to be customized in ways not possible with manual switching arrangements. When a manual switch is used, the backup or secondary battery must be designed to accommodate the design compromises between starting and continuous operation required of other batteries. This is because the backup battery remains switched into the circuit for long periods of time. Thus, to drive both electrical features such as lights and ignition circuits a heavy duty deep cycling battery is required.

In contrast, with automatic engagement of the backup, the backup battery can be optimized for high starting power with little cycling. Indeed, the backup battery could be a highly charged capacitor, while the primary battery could be constructed with thick plates for cycling. Thus, overall battery performance and life cycle are improved by using the automatic switching mechanism.

While specific embodiments of the invention have been described and illustrated, it will be clear that variations in the details of the embodiments specifically illustrated and described may be made without departing from the true spirit and scope of the invention as defined in the appended claims.

We claim:

1. An apparatus for supplying electrical power to a system comprising:
   an on-off switch, the on-off switch supplying power from a power supply terminal to a system power terminal in a first state and preventing supply of power from the power supply terminal to the system power terminal in a second state;
   a first power supply providing power to the power supply terminal;
   a second power supply;
   a triggerable switch having a first terminal connected to the power supply terminal, a second terminal connected to the second power supply and a trigger input, the trigger input, when activated causing the first and second terminals to be connected through a lower impedance;

a comparator having an output for indicating a low power condition when a voltage level of the first power supply is below a predetermined reference at a time before the on-off switch supplies power form the power supply terminal to the system power terminal in the first state of the on-off switch; and a trigger coupled to the trigger input of the triggerable switch and the output of the comparator, the trigger being enabled by engagement of the first state of the on-off switch, the trigger having an output activating the trigger input of the triggerable switch when the comparator output indicates the low power condition.

2. The apparatus recited in claim 1 wherein the trigger comprises a bias circuit for applying a negative voltage to the system power terminal.

3. The apparatus recited in claim 2 wherein the trigger comprises a trigger comparator having an output indicating a non-negative voltage on the system power terminal, the non-negative voltage being applied by engagement of the first state of the on-off switch.

4. The apparatus recited in claim 3 the trigger further comprising a flip-flow having an input driven by the comparator output and a clock input clocked by the output of the trigger comparator, an output of the flip-flop activating the trigger input of the triggerable switch when the comparator output indicates the lower power condition.

5. The apparatus of claim 4 further comprising a flip-flop reset, the flip-flop reset setting the flip-flop output to a state deactivating the trigger input of the triggerable switch after a predetermined time.

6. The apparatus of claim 5 wherein the flip-flop reset comprises a detector and a timer, the detector activating the timer immediately when the trigger input to the triggerable switch is deactivated after being previously activated.

7. The apparatus of claim 1 wherein the triggerable switch comprises a transistor.

8. The apparatus recited in claim 7 wherein the triggerable switch comprises a field effect transistor.

9. The apparatus recited in claim 1 wherein the triggerable switch comprises a battery solenoid.

10. The apparatus recited in claim 1 wherein the first power supply is a deep cycling battery and the second power supply is a high starting power battery.

11. The apparatus recited in claim 3 wherein the trigger comprises a pair of flip-flops, a first of the flip flops having a first input driven by the comparator output, the second flip flop having an input driven by an output of the first flip flop, both flip flops having a clock input routed to ht output of the trigger comparator, and wherein an output of the second flip flop is routed to activate the trigger input of the triggerable switch when the comparator output indicates the low power condition.

12. The apparatus recited in claim 3 wherein the trigger comprises:

a first flip flop having a first input driven by the comparator output;

a set switch having at least a first position and a second position;

a second flip flop having an input routed to the comparator output when the set switch is in the first position and routed to an output of the first flip flop when the set switch is in the second position;

an output of the second flip flop being routed to drive control circuitry for triggering the input of the triggerable switch when the comparator output indicates the low power condition.

13. An apparatus as recited in claim 1 further comprising at least one manual override, the manual override continuously activating the trigger.

14. The apparatus recited in claim 1 further comprising a visible indicator, the indicator indicating when the trigger is activated.

15. An apparatus for supplying electrical power to a system comprising:

an on-off switch, the on-off switch supplying power from a power supply terminal to a system power terminal in a first state and preventing supply of power from the power supply terminal to the system power terminal in a second state;

a fist power supply providing power to the power supply terminal;

a second power supply;

a triggerable switch having a first terminal connected to the power supply terminal, a second terminal connected to the second power supply and a trigger input, the trigger input, when activated causing the first and second terminals to be connected through a low impedance;

a comparator disposed to compare a parameter indicative of the power level of the first power supply to a predetermined reference condition, the comparator having an output for indicating when the parameter is outside a predetermined reference condition; and a trigger coupled to the trigger input of the triggerable switch and the output of the comparator, the trigger being enabled by engagement of the first state of the on-off switch, the trigger having an output activating the trigger input of the triggerable switch when the comparator output indicates the parameter is outside the predetermined reference condition.

16. The apparatus recited in claim 15 wherein the monitored parameter is ambient temperature around the first power source.

17. The apparatus recited in claim 16 wherein the monitored parameter is outside the reference condition when the ambient temperature falls below a predetermined threshold.

18. The apparatus recited in claim 15 wherein the monitored parameter is current drawn from the first power source.

19. The apparatus recited in claim 18 wherein the monitored parameter is outside the reference condition when the current drawn from the first power supply exceeds a predetermined threshold.

20. A method of supplying electrical power to a system comprising:

supplying power form a power supply terminal to a system power terminal through an on-off switch in a first state and preventing supply of power from the power supply terminal to the system power terminal in a second state;

providing power to the power supply terminal through a first power supply;

connecting the first and second terminals through a triggerable switch, the triggerable switch having a first terminal connected to the power supply terminal, a second terminal connected to a second power supply and a trigger input, the trigger input causing the first and second terminals to be connected when activated;

indicating a low power condition form an output of a comparator when a voltage level of the first power supply is below a predetermined reference at a time before the on-off switch supplies power from the power supply terminal to the system power terminal in the first state of the on-off switch; and enabling a trigger, which is coupled to the on-off switch, the trigger input of the triggerable switch, and the output of the comparator, by engagement of the first state of the on-off switch, the trigger having an output activating the trigger input of the triggerable switch when the comparator output indicates the low power condition.

21. The method of claim 20 wherein the triggerable switch is a transistor.

22. The method of claim 20 wherein the triggerable switch is a field effect transistor.

23. The method of claim 20 wherein the first power supply s a deep cycling battery and the second power supply is a high starting power battery.

24. The method recited in claim 20 further comprising the step of providing at lest one manual override, the manual override continuously activating the trigger.

25. The method recited in claim 20 further comprising the step of activating a visible indicator when the trigger is activated.

* * * * *